(12) United States Patent
Schaefer et al.

(10) Patent No.: US 11,947,806 B2
(45) Date of Patent: Apr. 2, 2024

(54) LIFE EXPECTANCY MONITORING FOR MEMORY DEVICES

(71) Applicant: Micron Technology, Inc., Boise, ID (US)

(72) Inventors: Scott E. Schaefer, Boise, ID (US); Aaron P. Boehm, Boise, ID (US); Scott D. Van De Graaff, Boise, ID (US); Todd J. Plum, Boise, ID (US); Mark D. Ingram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/505,028

(22) Filed: Oct. 19, 2021

(65) Prior Publication Data

US 2022/0137827 A1    May 5, 2022

Related U.S. Application Data

(60) Provisional application No. 63/109,168, filed on Nov. 3, 2020.

(51) Int. Cl.
  *G06F 3/06* (2006.01)
  *G06F 12/02* (2006.01)
(52) U.S. Cl.
  CPC .......... *G06F 3/0616* (2013.01); *G06F 3/0655* (2013.01); *G06F 3/0679* (2013.01)
(58) Field of Classification Search
  CPC ..... G06F 3/0616; G06F 3/0655; G06F 3/0679
  USPC ........................................................ 711/154
  See application file for complete search history.

(56) References Cited

U.S. PATENT DOCUMENTS

| 7,962,792 | B2 * | 6/2011 | Diggs | G06F 3/0616 |
| | | | | 714/30 |
| 2009/0135646 | A1 * | 5/2009 | Murin | G11C 11/5642 |
| | | | | 365/185.2 |
| 2010/0306580 | A1 * | 12/2010 | McKean | G06F 12/0246 |
| | | | | 711/E12.001 |
| 2012/0198129 | A1 | 8/2012 | Van Aken et al. | |
| 2013/0179624 | A1 * | 7/2013 | Lambert | G06F 12/0246 |
| | | | | 711/E12.008 |
| 2014/0365725 | A1 * | 12/2014 | Barrell | G06F 3/0689 |
| | | | | 711/113 |

(Continued)

OTHER PUBLICATIONS

IEEE Search (Year: 2023).*

(Continued)

*Primary Examiner* — Prasith Thammavong
*Assistant Examiner* — Sidney Li
(74) *Attorney, Agent, or Firm* — Holland & Hart LLP

(57) ABSTRACT

Methods, systems, and devices for life expectancy monitoring for memory devices are described. A memory device may monitor a parameter of a component of the memory device or the memory device overall, and may determine whether the parameter satisfies a threshold. The parameter may represent or be associated with a lifetime of the component, a level of wear of the component, or an operating parameter violation of the component, or any combination thereof. The memory device may communicate, to a host device, an indication of the parameter satisfying the threshold, and the host device may use the information in the indication to adjust one or more parameters associated with operating the memory device, among other example operations.

22 Claims, 9 Drawing Sheets

(56) References Cited

U.S. PATENT DOCUMENTS

| | | | |
|---|---|---|---|
| 2015/0186072 A1* | 7/2015 | Darragh | G11C 16/3495 |
| | | | 711/103 |
| 2017/0131947 A1* | 5/2017 | Hoang | G06F 11/3034 |
| 2017/0221573 A1 | 8/2017 | Darragh et al. | |
| 2019/0278498 A1 | 9/2019 | Dedrick | |
| 2019/0384257 A1 | 12/2019 | Zhang et al. | |
| 2020/0133513 A1 | 4/2020 | Zhang et al. | |

OTHER PUBLICATIONS

"International Search Report and Written Opinion of the International Searching Authority," issued in connection with Int'l Appl. No. PCT/US21/55868, dated Feb. 10, 2022 (10 pages).

* cited by examiner

LIFE EXPECTANCY MONITORING FOR MEMORY DEVICES

CROSS REFERENCE

The present application for Patent claims the benefit of U.S. Provisional Patent Application No. 63/109,168 by Schaefer et al., entitled "LIFE EXPECTANCY MONITORING FOR MEMORY DEVICES," filed Nov. 3, 2020, assigned to the assignee hereof, and expressly incorporated by reference herein.

FIELD OF TECHNOLOGY

The following relates generally to one or more systems for memory and more specifically to life expectancy monitoring for memory devices.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
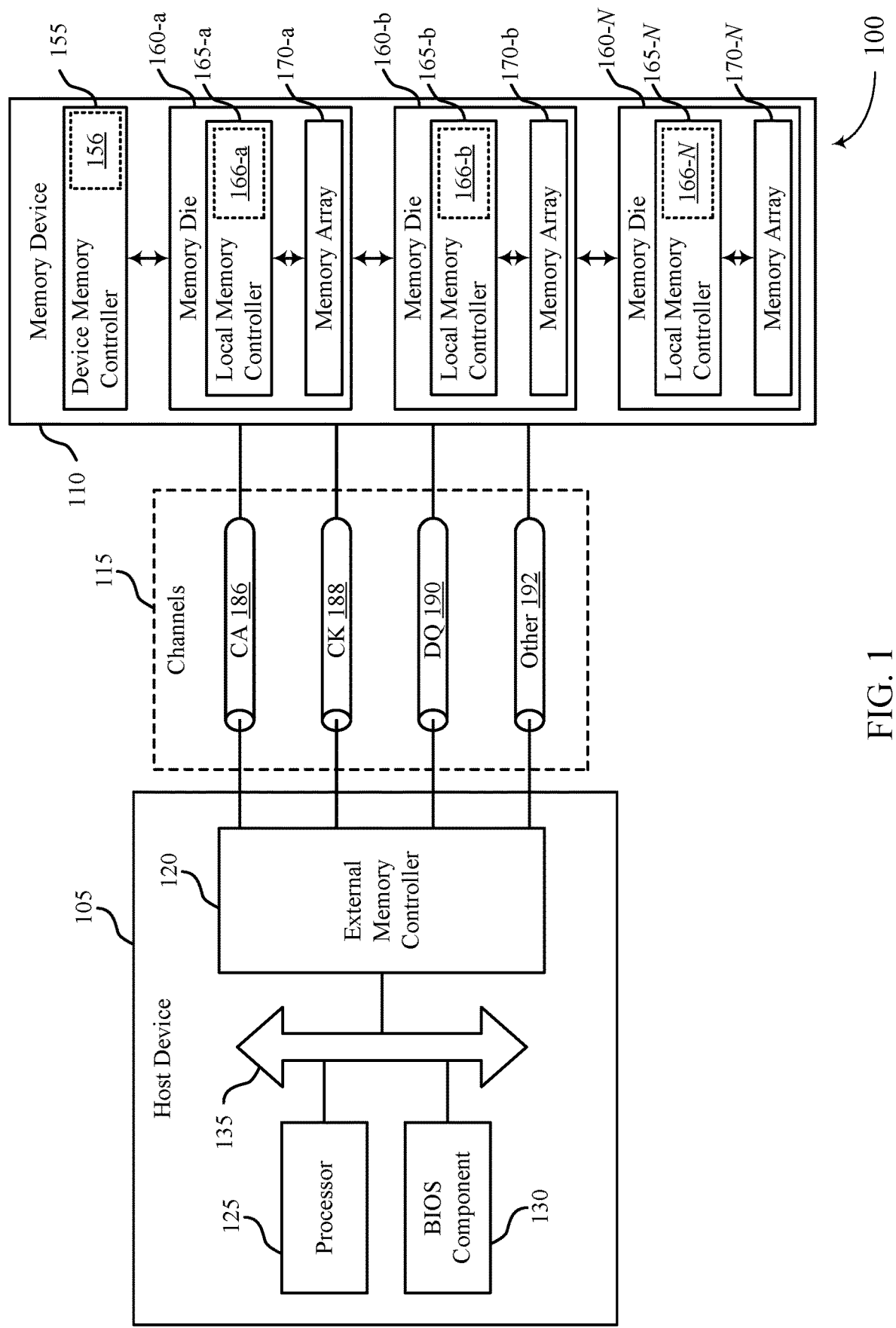
FIG. 1 illustrates an example of a system that supports life expectancy monitoring for memory devices in accordance with examples as disclosed herein.

A memory device may be included in various system applications, such as in a mission critical application. In some cases, failure of the memory device within the system may lead to malfunction or failure of the system, which may result in extra costs or danger to an end user of the system. As such, a system designer (e.g., a host device supplier, a system integrator, an original equipment manufacturer, or any combination thereof) may attempt to perform corrective action for the memory device (e.g., adjust or replace the memory device) before the memory device fails. However, the system designer may base an estimate of memory device failure on predictive modeling or other techniques that may not result in an accurate estimate of memory device lifetime (e.g., a quantity of time until memory device failure). Accordingly, the memory device may fail at a time that the system designer does not expect, which may lead to increased costs and safety failure, among other disadvantages. Further, in some cases, the system designer may implement the memory device in the system such that the memory device may violate one or more operating parameters without the knowledge of the system designer. Such violations may contribute to the possibility of failure of the memory device (e.g., premature failure of the memory device).

The present disclosure provides techniques for monitoring and reporting one or more parameters associated with a life expectancy of a memory device, among other aspects. For example, the memory device may include monitoring circuitry, which may monitor one or more parameters of the components of the memory device. The one or more parameters may include or be associated with a level of wear or degradation of the components of the memory device, or with an operating parameter violation of the memory device, or both. The memory device may measure a value of the one or more parameters and determine whether the value satisfies (e.g., is equal to or greater than) a threshold. In some cases, the threshold may represent one of multiple thresholds, where each threshold may represent a different level of wear or a different point in a lifetime of the memory device. In some cases, the threshold may represent a pass or fail point of the lifetime of the memory device.

If the value satisfies the threshold, this may indicate that a lifetime milestone of the memory device has been reached, a degradation or wear level of the memory device has been reached, or an operating parameter of the memory device has been violated, or some any combination thereof. The memory device may communicate, to a host device, an indication of the parameter satisfying the threshold, and the host device may use the information in the indication to adjust one or more parameters associated with operating the memory device (e.g., indicate a replacement of the memory device, adjust voltages or timings of the memory device). Such techniques may support increased memory device lifetimes as well as an increased accuracy in predicting and notifying a host device of memory device failure (e.g., an end of life), among other advantages.

Features of the disclosure are initially described in the context of systems and dies as described with reference to FIGS. 1 and 2. Features of the disclosure are described in the context of a model and process flows as described with reference to FIGS. 3-5. These and other features of the disclosure are further illustrated by and described with reference to an apparatus diagram and flowcharts that relate to life expectancy monitoring for memory devices as described with reference to FIGS. 6-9.

FIG. 1 illustrates an example of a system 100 that supports life expectancy monitoring for memory devices in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package. The memory device 110 (e.g., the device memory controller 155, one or more memory dies 160, one or more local memory controllers 165, one or more memory arrays 170) may be configured to operate in response to commands from the host device 105 (e.g., from the external memory controller 120, from the processor 125).

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device.

Each channel 115 may be an example of a transmission medium that carries information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, physical or operational aspects of the memory device 110 may degrade over time, and this degradation may be associated with a reduction of an ability to reliably store information (e.g., at a memory array 170), a reduction of an ability to reliably read information (e.g., from a memory array 170), a reduction of an ability to process information (e.g., at a local memory controller 165, at a device memory controller 155), or a reduction of an ability to communicate information (e.g., within the memory device 110, between the memory device 110 and the host device 105), among other issues.

Degradation of the memory device 110 may be associated with a cumulative duration of being powered (e.g., the memory device 110 being powered by the host device 105 via a power supply interface, one or more memory dies 160 being powered by the device memory controller 155), a cumulative duration or quantity of operations over which one or more memory dies 160 or memory arrays 170 are accessed, a cumulative duration or quantity of operations over which an operating parameter (e.g., a temperature of the memory device 110 or one or more memory dies 160, a voltage of the memory device 110 or one or more memory dies 160, a moisture or humidity level of an environment while operating the memory device or one or more memory dies 160, an access rate, or other parameter of the memory device 110 or a memory die 160) satisfies a threshold, and other conditions.

Over time, one or more components or circuitry of the memory device 110 or one or more memory dies 160 may experience dielectric breakdown, ion or other constituent material migration or transformation, thermal stress or damage, mechanical stress or damage, fatigue, or other changes that affect operational reliability of the memory device 110. Thus, according to these and other examples, a memory device 110, or memory dies 160 thereof, may be associated with a finite life expectancy for supporting access operations.

In accordance with examples as disclosed herein, the memory device 110 (e.g., the device memory controller 155, one or more memory dies 160) may include various components (e.g., logic, circuitry, sensors) configured for monitoring health and life expectancy of the memory device 110. Such monitoring may include or involve components internal to the memory device 110, such as a monitoring circuit 156 of a device memory controller 155, one or more monitoring circuits 166 of one or more local memory controllers 165, or various combinations thereof, that monitor for degradation of particular components, circuits, voltages, timings, or other characteristics of operating the memory device 110.

In some examples, such components may include sensors, other circuits, or logic (among other examples) to monitor or detect voltages resulting from the memory device 110 performing an operation, or durations associated with the memory device 110 performing an operation, or other signals or operating characteristics or combinations thereof. Such information may be compared (e.g., by the memory device 110, by the host device 105) to corresponding thresholds that are associated with a respective life expectancy level (e.g., a duration of remaining life, a percentage of remaining life). In various examples, such thresholds may be determined based on simulation, testing, or other analysis and configured at the memory device 110. The determined thresholds may be stored at or generated by components of the memory device 110 or host device 105 to support the described comparisons, which may be performed on a periodic basis (e.g., initiated by a time interval, initiated based on a quantity of operations), or initiated by a triggering condition at the memory device 110 or the host device 105 (e.g., a power cycle, a transition to an idle or power-down mode, an identified maintenance or diagnostic condition or triggering signal).

In some examples, the memory device 110 (e.g., a device memory controller 155, a local memory controller 165) may include a non-volatile storage component for storing an indication of a life expectancy of the of the memory device 110, which may refer to a storage component that is included in or separate from the memory arrays 170 of the memory device 110. Such a non-volatile storage component may be physically coupled with or otherwise attached to a same substrate as a memory array 170 or a memory die 160 (e.g., a same chip or other semiconductor substrate), or a same substrate as the memory device 110 (e.g., a same printed circuit board (PCB) or other memory module, such as a substrate of a dual in-line memory module (DIMM)). In some examples, such a non-volatile storage component may be referred to as a register or a mode register, which may be read from or written to by a host device 105 (e.g., via channels 115) to determine parameters of the memory device 110. In some examples, such a storage component may not be accessible to a host device 105, but may be used by the memory device 110 to determine parameters of operating the memory device 110, or determine status signaling to transmit to a host device 105 (e.g., via channels 115).

A memory device 110 may thus monitor and report one or more parameters associated with a life expectancy of the memory device 110. For example, monitoring circuitry of the memory device 110 (e.g., monitoring circuits 156 or 166) may monitor one or more parameters of a component of the memory device 110. The one or more parameters may include or be associated with a level of wear or degradation of the component, or with an operating parameter violation of the memory device 110, or both. The memory device 110 may measure a value of the one or more parameters and determine whether the value satisfies a threshold. If the value satisfies the threshold, this may indicate that a lifetime milestone of the memory device 110 has been reached, a degradation or wear level of the memory device 110 has been reached, or an operating parameter of the memory device 110 has been violated, or any combination thereof.

The memory device 110 may communicate (e.g., via one or more channels 115), to a host device 105, an indication of the one or more parameters satisfying the threshold, and the host device 105 may use the information in the indication to adjust one or more parameters associated with operating the memory device 110 (e.g., indicate a replacement of the memory device 110, adjust voltages or timings of the memory device 110). Such techniques may support increased memory device lifetimes as well as an increased accuracy in predicting and notifying a host device 105 of memory device failure (e.g., an end of life), among other advantages.

Figure 2:
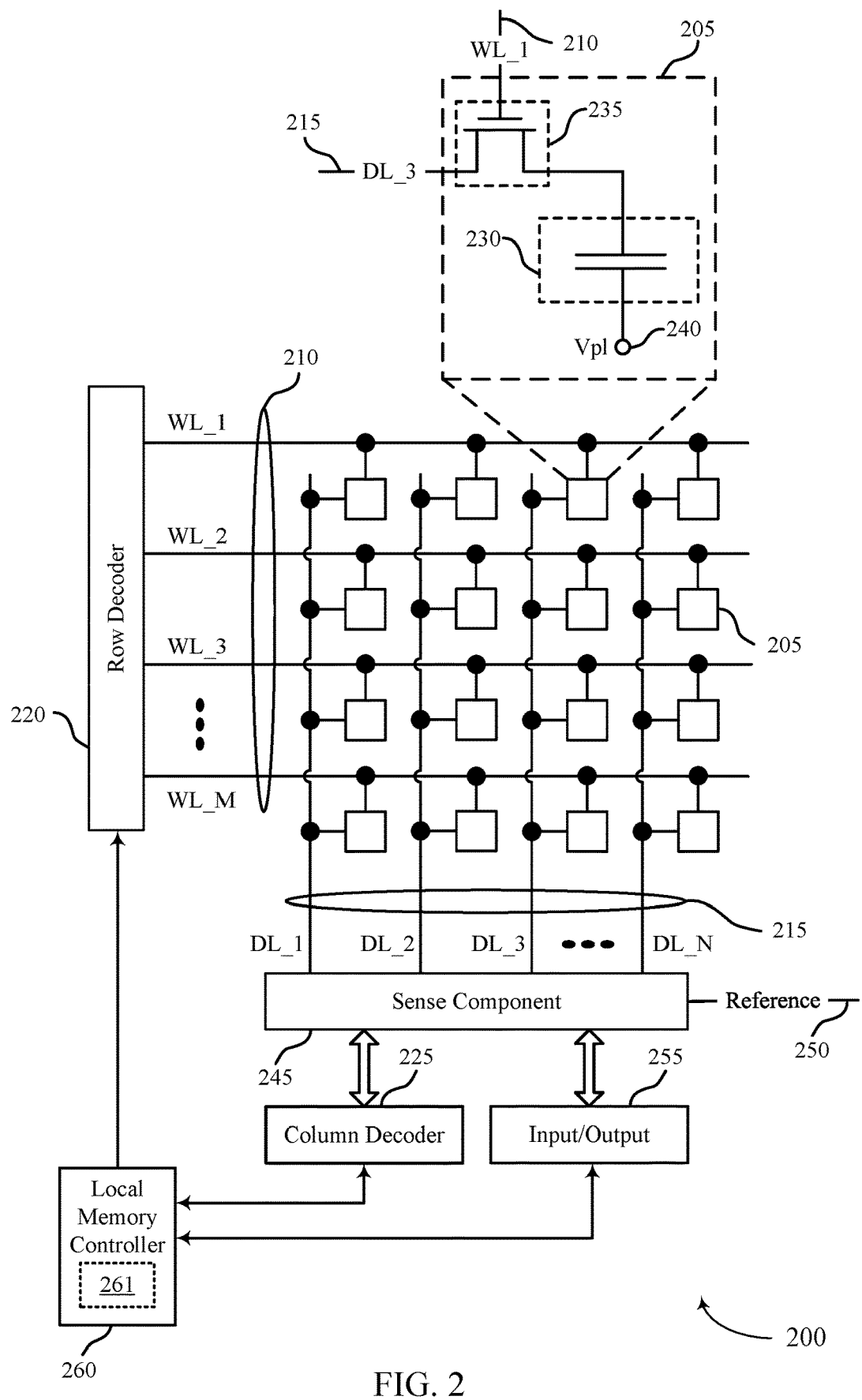
FIG. 2 illustrates an example of a memory die that supports life expectancy monitoring for memory devices in accordance with examples as disclosed herein.

FIG. 2 illustrates an example of a memory die 200 that supports life expectancy monitoring for memory devices in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 (e.g., of a memory device 110) described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output component 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some examples, physical or operational aspects of the memory die 200 may degrade over time, and this degradation may be associated with a reduction of an ability to reliably store information (e.g., at a memory cell 205), a reduction of an ability to reliably read information (e.g., from a memory cell 205), a reduction of an ability to process information (e.g., at a local memory controller 260), or a reduction of an ability to communicate information (e.g., within the memory die 200, via digit lines 215, via input/output component 255, between the memory die 200 and a device memory controller 155), among other issues.

Degradation of the memory die 200 may be associated with a cumulative duration of the memory die 200 being powered (e.g., by a host device 105, by a device memory controller 155), a cumulative duration or quantity of access operations over which memory cells 205 are accessed or the local memory controller 260 is otherwise supporting access operations, a cumulative duration or quantity of access operations over which an operating parameter (e.g., a temperature, voltage, access rate, or other parameter of the memory die 200) satisfies a threshold, some combination thereof, or other conditions. For example, one or more components of the memory die 200 may experience dielectric breakdown, ion or other constituent material migration or transformation, thermal stress or damage, mechanical stress or damage, fatigue, or other changes that affect operational reliability of the memory die 200.

In accordance with examples as disclosed herein, the memory die 200 (e.g., the local memory controller 260) may include various components (e.g., logic, circuitry, sensors) configured for monitoring health and life expectancy of the memory die 200. Such monitoring may include or involve components internal to the memory die 200, such as a monitoring circuit 261, which may be an example of a monitoring circuit 166 described with reference to FIG. 1. A monitoring circuit 261 may be configured to monitor for degradation of particular components, circuits, voltages, timings, and other characteristics of operating the memory die 200. In some examples, a monitoring circuit 261 may be configured to monitor for changes of a voltage level of a voltage source, for changes in a voltage resulting from an access operation, or for changes in threshold voltages of one or more transistors (e.g., switching components 235, word line or digit line selection components, transistors of a row decoder 220, a column decoder 225, a sense component 245, or a local memory controller 260).

Additionally or alternatively, a monitoring circuit 261 may be configured to monitor for changes in durations or time constant behavior of performing various operations (e.g., a duration or time constant between activating a switching component and developing a signal that satisfies a threshold, a duration or time constant between accessing a memory cell 205 and developing a signal that satisfies a threshold, a duration, frequency, or phase shift of a clock signal or other timing signal generated at the memory die 200). The monitoring circuit 261 may be configured to perform comparisons between monitored parameters to one or more threshold values, which may be indicative of a life expectancy of the memory die 200, or component thereof (e.g., a life expectancy of the memory cells 205, the switching components 235, a row decoder 220, a column decoder 225, a sense component 245, an input/output component 255, or a local memory controller 260)

A memory device 110 may thus monitor and report one or more parameters associated with life expectancy. For example, monitoring circuitry (e.g., a monitoring circuit 261) may monitor one or more parameters of one or more components (e.g., memory cells 205, switching components 235, a row decoder 220, a column decoder 225, a sense component 245, an input/output component 255, a local memory controller 260). The one or more parameters may include or be associated with a level of wear or degradation of the component, or with an operating parameter violation, or both. The memory device 110 may measure a value of the one or more parameters and determine whether the value satisfies a threshold, and may communicate, to a host device 105, an indication of the one or more parameters satisfying the threshold. The host device 105 may use the information in the indication to adjust one or more parameters associated with operating the memory device 110.

Figure 3:
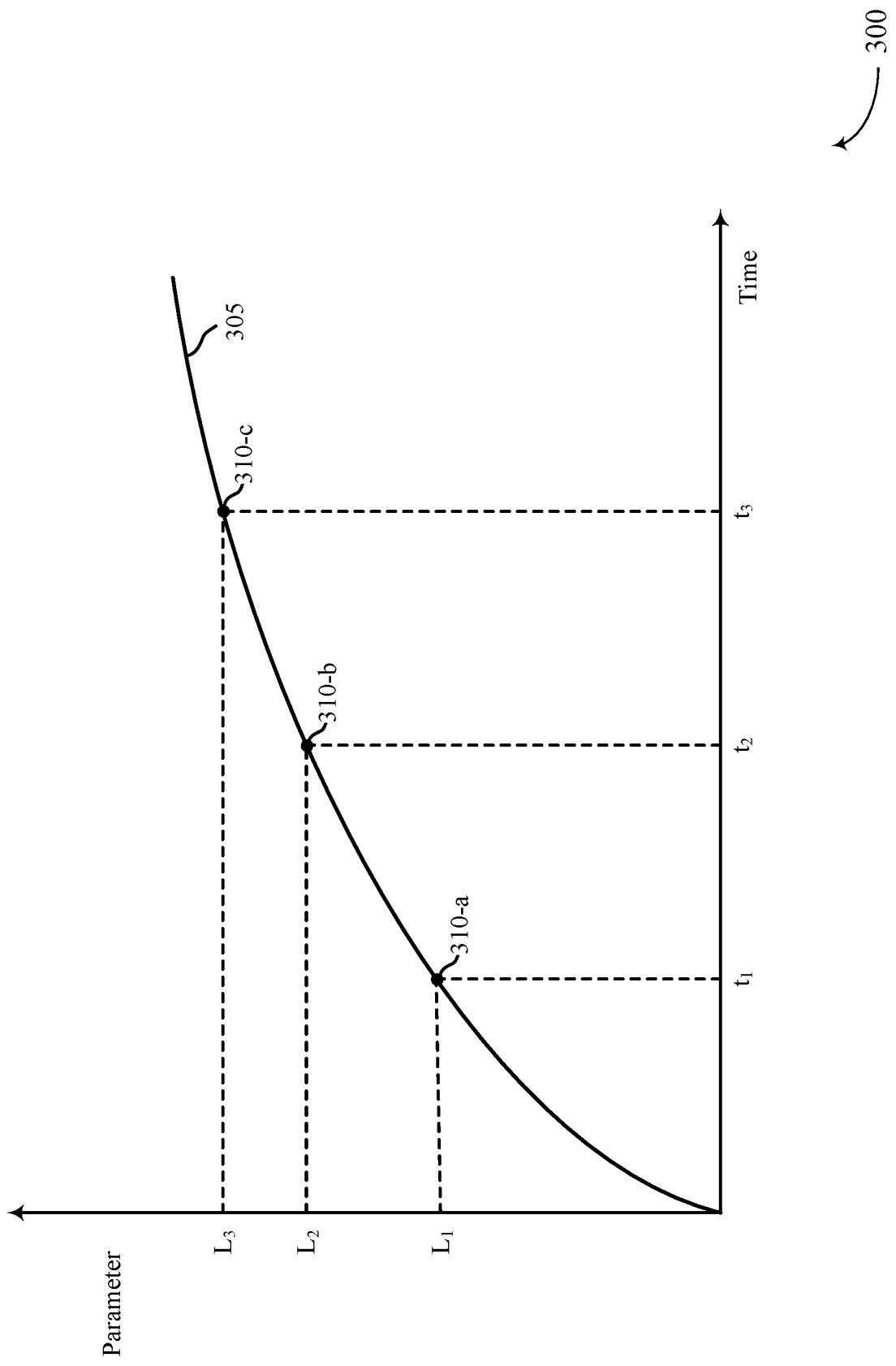
FIG. 3 illustrates an example of a model that supports life expectancy monitoring for memory devices in accordance with examples as disclosed herein.

FIG. 3 illustrates an example of a model 300 that supports life expectancy monitoring for memory devices in accordance with examples as disclosed herein. The model 300 may include a curve 305 of an expected change or degradation of a parameter of a memory device 110, or a component of a memory device 110, over time. The time may refer to an absolute or clock time, or may refer to a normalized time or duration such as a percentage of a projected design life (e.g., where 100% corresponds to an expected or designed operating life of the memory device 110). The memory device 110 may monitor one or more parameters using the techniques described herein.

There may be an expected degradation or wear over time of various circuits of the memory device 110, or the memory device 110 as a whole. For example, over time, components or circuitry of the memory device 110 may experience dielectric breakdown, ion or other constituent material migration or transformation, thermal stress or damage, mechanical stress or damage, fatigue, or other changes that affect operational reliability or performance of the memory device 110. In some examples, curve 305 may illustrate an expected change of a parameter that results from such degradation or wear. The parameter illustrated by the model 300 may refer to a voltage resulting from an operation of the memory device 110, a duration or other timing to perform or otherwise associated with performing an operation of the memory device 110, a temperature, or some other characteristic resulting from performing an operation of the memory device 110, which may degrade or otherwise change over the operating life of the memory device 110.

Curve 305 may be determined based on analytical or statistical modeling of the operation or corresponding components of the memory device 110, testing or determination of (e.g. observation of) one or more operations or components of a memory device 110 or representative population of memory devices 110 (e.g., a test population), or other techniques or combinations thereof. In some examples, to generate curve 305, a worst-case or other usage assumption may be used to support a robust design of a memory device 110. In some examples, a host device 105 may use different degradation readouts from the memory device 110 (e.g., taken at different points in time or over the lifetime of the memory device 110) to determine a slope of curve 305, among other potential conditions or metrics, and estimate a wear-out point of the memory device 110 (e.g., and thereby generate curve 305).

Levels of degradation or wear of a memory device 110 (e.g., or component thereof) at various (e.g., key) time intervals along a curve 305 may be selected as trip points for a life expectancy monitoring or flagging system. Such levels may be represented, for example, by various determined points which may be design points 310 (e.g., design points 310-*a* through 310-*c*). Each of the design points 310 may be associated with a respective time (e.g., lifetime) and parameter value (e.g., design point 310-*a* being associated with a time, and a parameter value, Li, and so on). Such design points 310 may be picked in a manner relative to how long a memory device 110 is designed to be used. Such design points may be associated with a life expectancy of a memory device 110, which may refer to a time duration or period over which the memory device 110 is expected to be operational, or operational within certain design parameters. For example, the design points may be associated with the memory device 110 being operational within a threshold rate of errors (e.g., a rate of correctible errors), operational within a threshold latency, operational within a threshold power consumption, or operational under certain assumed or predicted operating parameters or environmental conditions, among other conditions.

In some examples, a life expectancy may refer to an inferred or predicted operational end point, at which the reliability of the memory device 110 may be uncertain or unknown, or may have a relatively high probability of failure (e.g., a probability of failure that satisfies a threshold). In various examples, a life expectancy of a memory device 110, or a component thereof, may be aligned with an expected design life of the memory device 110 itself, or may be considered in the context of an expected design life of a system that includes the memory device 110 (e.g., aligned with or designed to exceed the design life of the system that includes the memory device 110, designed with some fraction of the design life of the system that includes the memory device 110 such that some rate of replacement is expected or anticipated).

In one example, a memory device 110 may be designed with a 20 year design life, and the design points 310-*a* through 310-*c* may be associated with times of $t_1=5$ years, $t_2=10$ years, and $t_3=15$ years of operating the memory device 110-*a*, respectively. Although illustrated in the context of three design points 310, the techniques described herein may support any quantity of one or more design points 310, or associated times and parameter values, to support various granularity or resolution for evaluating life expectancy of a memory device 110, or one or more components thereof.

For example, one or more design points 310 may be configured for providing relatively early notice of one or more wear-out mechanisms of the memory device 110 or a component thereof. The one or more design points 310 may additionally or alternatively be used to identify a component of the memory device 110 that may be experiencing a faster than expected wear-out or degradation rate (e.g., that may therefore fall short of a life expectancy of the component or the memory device 110). Notifications of wear-out mechanisms or degradation rate may provide information to a host device 105, which may be used (e.g., by a device, a system provider, an end user) to reduce a probability of failure of an overall system that includes the memory device (e.g., by adjusting one or more parameters to extend a life of the memory device 110 or by replacing the memory device 110 before failure). In some cases, the memory device 110 may support techniques for a device, a component, or a designer of the system (e.g., a provider of a host device 105) to define the one or more design points 310 for providing notifications (e.g., define one or more trigger states).

The memory device 110 may be configured to monitor and report life expectancy, or a parameter associated with life expectancy. For example, the memory device 110 may estimate or measure a life expectancy based on a measured or determined parameter value, which may correspond to a life expectancy. The parameter may, for example, represent a level of wear (e.g., performing a quantity of operations that over time will lead to a level of wear), a violation of an operating parameter, a rate of degradation, or other parameter associated with one or more components of the memory device 110, where a value of the parameter may correspond to a time or life expectancy of the memory device 110. The memory device 110 may determine or measure the parameter and report an associated life expectancy or the parameter itself to a host device 105 (e.g., based on the parameter satisfying a threshold value, such as a design point 310).

The memory device 110 may include circuitry or other components for monitoring life expectancy and other parameters at the memory device 110. For example, the circuitry (e.g., monitoring circuitry) may measure or determine (e.g., periodically, such as one time a day or upon power down) a value of the parameter and may indicate the parameter, a corresponding life expectancy, or both, to the host device 105.

In some examples, the times or parameter values of a model such as the model 300 may correspond to threshold values for which a comparison may be made when evaluating a life expectancy or remaining life of a memory device 110. In other words, the times and parameter values of curve 305 may provide a proxy or a prediction for degradation or life expectancy of memory devices 110, or components thereof, which may be used by logic or circuitry to report various life expectancy characteristics of a particular memory device 110.

Measuring and reporting parameters or values associated with a life expectancy of the memory device 110 may support indication of one or more wear mechanisms for the memory device 110, an approaching end-of-lifetime of the memory device 110 (e.g., or a component thereof), or both. An indication associated with the life expectancy of the memory device 110 may support replacement of the memory device 110, adjustment of one or more operating parameters of the memory device 110 (e.g., to extend the life expectancy of the memory device 110), identification of one or more weak spots or components of the memory device 110 (e.g., faster than expected degradation), improved prediction and modeling, or any combination thereof.

In one example, the parameter of curve 305 may represent a quantity of row active time, such as a quantity of time that a row voltage stays below or above a threshold (e.g., stays low, stays high). If the row voltage stays below the threshold for a long period, the lower voltage may result in voltage leakage, may disrupt one or more signals, or may also result in wear to one or more components of the memory device 110 (e.g., transistor degradation, hot carrier degradation, negative-bias temperature instability (NBTI), non-conducting stress (NCS)). In one example, the parameter of curve 305 may, for example, represent a total quantity of time the row voltage has been below the threshold (e.g., since installation of the memory device 110 or during a current power cycle of the memory device 110). In some examples, the parameter of curve 305 may represent a percentage of operating time that the row voltage stays below the threshold.

In some examples, the memory device 110 may be configured to report the parameter of curve 305 (e.g., or associated values) once an end of life of the memory device 110, or component thereof, is reached (e.g., based on the parameter). Additionally or alternatively, a user of the memory device 110 (e.g., a system manufacturer) may have an option of selecting a different report condition, such as a window from an end of life (e.g., within 10% of the end of life).

In another example, curve 305 may represent a change or degradation over time of a voltage resulting from an operation of a memory device 110. Such an example may refer to a voltage directly resulting from an operation of a memory device 110 (e.g., an observed voltage signal, an observed threshold voltage for activating a transistor), or may refer to a difference between a voltage resulting from an operation of the memory device 110 and a baseline or initial condition. One example of such a relationship is illustrated by Table 1, associating each of three design points 310 over a 20 year expected design life with an operating time, a remaining life, an expected degradation (e.g., an expected voltage level, an expected operating condition level), and a concern level.

TABLE 1

Example of expected voltage degradation over time

| Operating Time | Remaining Life | Expected Degradation | Concern Level |
|---|---|---|---|
| 5 years | 75% | 25 mV | Low Risk |
| 10 years | 50% | 40 mV | Medium Risk |
| 15 years | 25% | 50 mV | High Risk |

In the examples described herein, the memory device 110 may determine (e.g., using the monitoring circuitry) a value of the parameter illustrated by curve 305 and may use the value to determine a location on curve 305. The location on curve 305 may, for example, represent the value and a corresponding life expectancy or operating time, such as illustrated by Table 1. The memory device 110 may indicate the value of the parameter, the associated operating time or life expectancy, or any combination thereof to a host device 105.

Additionally or alternatively, a similar relationship may be established for one or more other monitored parameters at the memory device 110, such as a monitored charge level, a monitored current level, a monitored duration, a monitored frequency, or other characteristics. Although curve 305 illustrates a change in operating characteristic that is positively correlated (e.g., increasing) over time, the described techniques may be applicable to various change or degradation relationships that are positively or negatively correlated, including linear, exponential, polynomial, logarithmic, or discontinuous (e.g., stepped) relationships over time.

Figure 4:
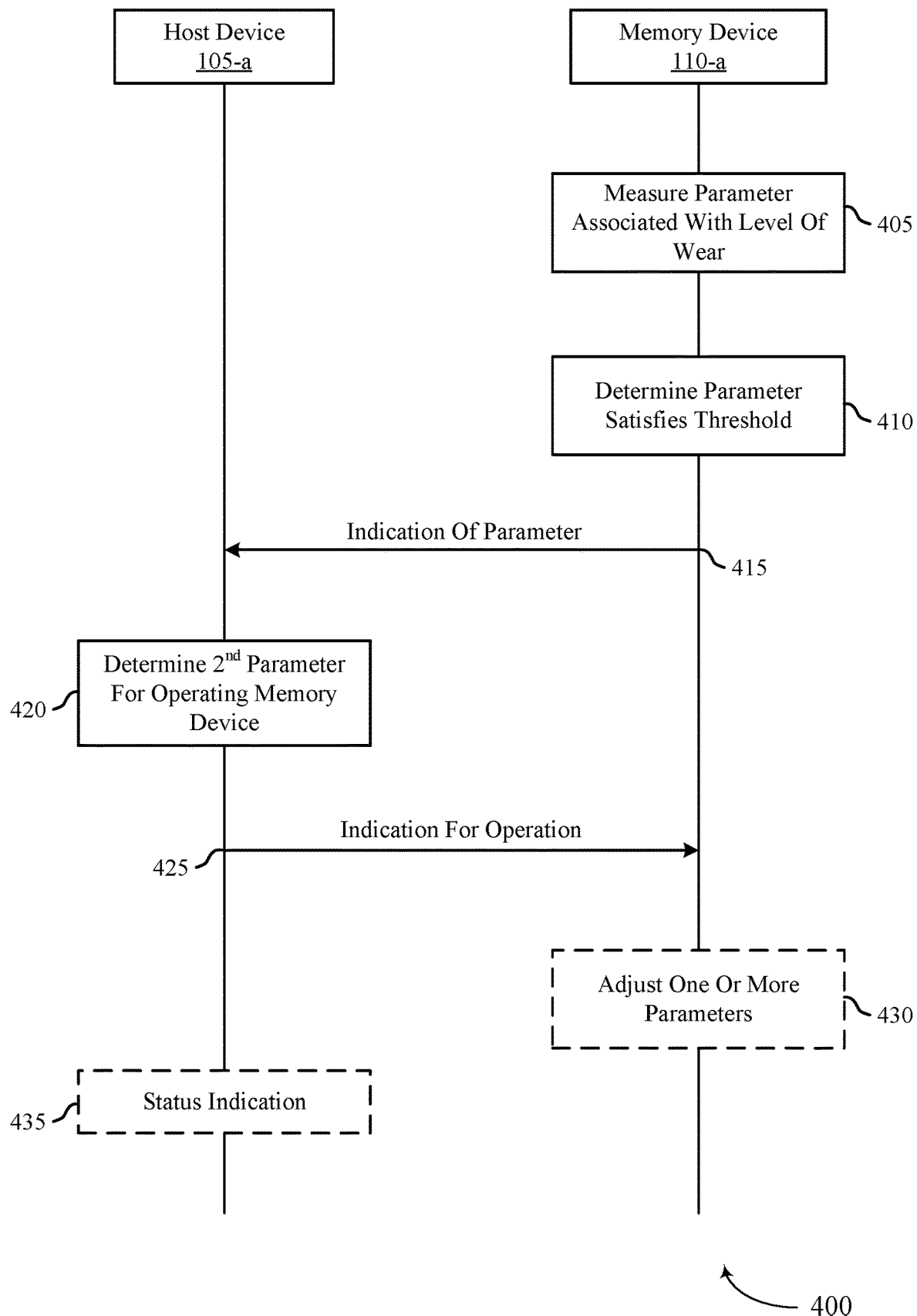
FIG. 4 illustrates an example of a process flow that supports life expectancy monitoring for memory devices in accordance with examples as disclosed herein.

FIG. 4 illustrates an example of a process flow 500 and that supports life expectancy monitoring for memory devices in accordance with examples as disclosed herein. The process flow 500 may be implemented by a host device 105-a and a memory device 110-a, which may be examples of the respective devices described with reference to FIGS. 1-3. The host device 105-a and the memory device 110-a may be coupled via a physical or logical interface, such as channels 115, that may support signaling between the respective devices. The memory device 110-a may illustrate an example of an apparatus that includes an array of memory cells 205 couplable to an interface with a processor or SoC (e.g., of the host device 105-a) and configured to operate in response to commands from the processor or the SoC.

The memory device 110-a may include logic or circuitry (e.g., a monitoring circuit 156, one or more monitoring circuits 166, one or more monitoring circuits 261, or various combinations thereof) for monitoring one or more parameters associated with a life expectancy of the memory device 110-a. The logic or circuitry may be attached to a same substrate, for example, as the array of memory cells 205, which may be configured to support various operations described herein. In some examples, the array of memory cells 205 of the memory device 110-a may be volatile memory cells, among other alternatives, and the memory device 110-a may include a non-volatile storage component (e.g., one or more non-volatile memory cells, latches, fuses, or anti-fuses) configured to store an indication of a life expectancy of the memory device 110-a.

At 405, the memory device 110-a may measure a parameter associated with a component of the memory device 110-a (e.g., by sampling, detecting, or determining the parameter). The parameter may be associated, for example, with a level of wear of the component or a degradation of the component or both. The parameter may be measured by monitoring circuitry of the memory device 110-a and may represent or be associated with a voltage, a current, a timing, an amount of time, a temperature, a degradation (e.g., NBTI or hot carrier degradation), or other parameters of a component of the memory device 110-a. The monitoring circuitry of the memory device 110-a may be configured to monitor such parameters, among other examples. In some cases, the monitoring circuitry (e.g., or a portion thereof) may be configured to be smaller than a minimum feature or minimum feature size of the memory device 110-a, for example, in order to monitor a parameter associated with any component of the memory device 110-a.

As described with reference to FIG. 3, the parameter may be representative of a level of wear of a component of the memory device 110-a, a rate of degradation of a component of the memory device 110-a, or any combination thereof. In one example, among others, the parameter may represent a current drawn by a sense amplifier of the memory device 110-a, where the current drawn by the sense amplifier may be representative of a wear-out of the sense amplifier. In another example, the parameter may represent a temperature of the component of the memory device 110-a.

At 410, the memory device 110-a may determine that the parameter satisfies a threshold based on a comparison of the parameter with the threshold. For example, the memory device 110-a may determine that a level of wear or a degradation rate associated with the component satisfies a corresponding threshold (e.g., based on comparing a measured parameter with a related threshold stored or programmed or otherwise present in the memory device 110-a). Identifying that a degradation rate associated with the component satisfies a corresponding threshold may support identification of a "weak spot" within the memory device 110-a (e.g., a component degrading at a faster than expected rate). For example, the degradation rate satisfying the threshold may indicate that the component is experiencing a larger than expected wear-out (e.g., which may shorten the life of the component and the memory device 110-a).

In some examples, the comparison of 410 may be associated with (e.g., followed by or support) determining an estimated remaining life (e.g., life expectancy) of the memory device 110-a, or that an estimate of remaining life of the memory device 110-a satisfies a threshold of remaining life. In some examples, the threshold may be associated with an age or operating history of the memory device, and the memory device 110-a may determine that a degradation of the memory device 110-a satisfies a threshold degradation (e.g., indicating degradation that is faster or slower than expected). In some examples, the memory device 110-a may store (e.g., in a non-volatile storage component) an indication that a remaining life of the memory device 110-*a* satisfies a threshold of remaining life.

In some examples, the operations at 405, or 410, or both, may be performed or initiated on a periodic basis (e.g., according to a duration of operation, according to a quantity of access operations, according to a monitoring interval) or alternatively on an aperiodic basis. In some examples, the operations at 405, or 410, or both, may be triggered by a condition at the host device 105-*a* or the memory device 110-*a* (e.g., triggered at a power cycle, triggered at a time of day, triggered at a deep power-down operation, triggered upon entering or exiting a power mode, triggered based on an access pattern, triggered upon a detection of a row hammer condition). In some examples, evaluation intervals or initiation conditions may be changed over time, such as shortening a testing interval based on a duration of operation, or a detected remaining life expectancy (e.g., based on flag bits). For example, if the memory device 110-*a* identifies an accelerated degradation or threshold life expectancy, a monitoring or evaluation interval may be shortened to support more frequent evaluation of the memory device 110-*a*.

In one example, the parameter may represent a temperature of the component of the memory device 110-*a*, and the memory device 110-*a* may determine that a threshold temperature level has been reached. In some cases, the memory device 110-*a* may be configured with multiple thresholds (e.g., temperature thresholds), and may determine when a corresponding threshold is satisfied.

At 415 (e.g., and as part of, or otherwise based on determining that the parameter satisfies the threshold), the memory device 110-*a* may communicate an indication that the parameter satisfies the threshold to the host device 105-*a*. The indication may be a proactive indication transmitted by the memory device 110-*a*, or may be in response to the memory device 110-*a* receiving a polling request from the host device 105-*a* (e.g., polling a mode register or other register of the memory device 110-*a* that stores the indication). In some cases, the memory device 110-*a* may proactively indicate (e.g., based on sending an indication or signal to the host device 105-*a*) for the host device 105-*a* to read (e.g., poll) the register storing the indication.

In some cases, the indication that the parameter satisfies the threshold may include an indication of a life expectancy of the memory device 110-*a* that may be determined by the memory device 110-*a*, for example, based on the measured parameter. In such cases, the indication may include an estimated percentage of remaining life of the memory device 110-*a*, or an estimated duration of remaining life of the memory device 110-*a*, or an indication that an estimate of remaining life of the memory device 110-*a* satisfies a threshold of remaining life.

In some examples, the indication may include sensor signal levels associated with measuring the parameter or may include an indication of the parameter (e.g., a parameter value), or both, which may support the host device 105-*a* performing various calculations or evaluations based on such signal levels or the parameter value (e.g., the host device 105-*a* may include one or more comparators or other evaluation logic or circuitry for performing the calculations or evaluations).

When the parameter is associated with a degradation rate or a weak spot of the memory device 110-*a*, the indication may identify the weak spot (e.g., or multiple weak spots) of the memory device 110-*a*. For example, if the degradation rate of the component satisfies the threshold, the memory device 110-*a* may indicate that the component is degrading faster than expected, or that the component may be a weak spot of the memory device 110-*a*.

The indication may include a binary indication that the parameter satisfies the threshold, or may include a gradient that may, for example, indicate a value of the parameter or an associated value (e.g., a life expectancy). In some cases, the indication may include suggestions or guidance from the memory device 110-*a* for actions to be taken by the host device 105-*a* (e.g., in response to the indication). For example, the indication may indicate or signal (e.g., suggest) for the host device 105-*a* to adjust a voltage, adjust a temperature (e.g., by adjusting one or more other factors), or increase a refresh rate of the memory device 110-*a* (e.g., a refresh rate of memory cells of the memory device 110-*a*). In some cases, the indication may include a warning based on exceeding the threshold or based on an amount or magnitude of exceeding the threshold. In some cases, the indication may include an amount or gradient of overuse of the component (e.g., based on the parameter exceeding the threshold), and may also include a suggestion to decrease a usage or a magnitude of usage of the component.

At 420, the host device 105-*a* may determine a second parameter for operating the memory device 110-*a* (e.g., based on the indication of the parameter or the life expectancy of the memory device 110-*a*, or both). In some examples, the second parameter may be related to one or more access operations on the memory device 110-*a* (e.g., determining or adjusting a voltage, current, or timing parameter for accessing the memory device 110-*a*). In some examples, the determination of the second parameter may include determining which of a set of memory devices 110 or memory arrays 170 (e.g., including the memory device 110-*a*) to use for an access operation. For example, the host device 105-*a* may determine to refrain from performing an access operation on the memory device 110-*a*, or determine to perform an access operation on a different memory device 110. In some examples, determining the second parameter may include determining an estimated life expectancy parameter associated with an age or operating history of the memory device 110-*a*, for example, based on comparing information from the indication to the estimated life expectancy parameter (e.g., based on a determination of whether the memory device 110-*a* is degrading more quickly or more slowly than expected).

In some examples, the indication of the parameter may be used by the host device 105-*a* to perform one or more responsive actions or determinations. For example, as described herein, the indication may include one or more suggested actions for the host device 105-*a* to take (e.g., associated with the second parameter). For example, one bit of a mode register of the memory device 110-*a* may be interpreted by the host device 105-*a* as an indication to throttle (e.g., slow down, reduce) a clock rate, such as lengthening a duration or period of a clock signal. Another bit of a mode register may be interpreted by the host device 105-*a* as an indication to use a power-down mode more often, which may occur at the expense of performance or latency. Another bit of a mode register may be interpreted by the host device 105-*a* as an indication to change an address scheme (e.g., if possible), such as accessing a different memory array 170, or accessing a different pattern of memory cells 205, among other examples. Thus, according to these and other examples, the memory device 110-*a* may use a mode register to support signaling to the host device 105-*a* one or more suggested actions (e.g., to perform for dynamic adjustment).

In some examples, the host device 105-*a* may determine to adjust a voltage parameter of the memory device 110-*a* (e.g., a voltage source level, a read or write bias, a reference voltage level), a timing parameter of the memory device 110-*a* (e.g., a duration or rate of performing access operations or portion thereof, a refresh interval, an idle duration), or both. In some examples, the host device 105-*a* or the memory device 110-*a* may identify a circuit slow-down, and the host device 105-*a* may determine to remedy the slow-down by increasing a voltage for performing subsequent access operations (e.g., adding 100 mV to a voltage supply circuit). In some examples, the host device 105-*a* may increase a refresh rate of one or more cells of the memory device 110-*a*.

In another example, degradation may be related to a duty cycle, such as an excessive timing skew. In such examples, the host device 105-*a* may enable or disable delay components to re-center timing. In some examples, the host device 105-*a* may enable a redundant circuit (e.g., disabling a first circuit component or memory array 170 and enabling a second circuit component or memory array 170). In some examples, the host device 105-*a* may adapt a sensor or corresponding signal on a signal line of the memory device 110-*a*, or adapt a threshold source or corresponding signal on a threshold line of the memory device 110-*a* (e.g., enabling a different threshold source), so that a comparator does not continue to flag the parameter as satisfying the threshold.

Although illustrated in the context of a response to a single parameter or single parameter measurement (e.g., at 405), in some examples, the described techniques may be performed in response to more than one parameter or associated evaluation. For example, the memory device 110-*a* or the host device 105-*a* may identify another parameter or another measurement of the parameter, and may compare the other parameter or other measurement to a corresponding threshold value. In such examples, the operations at 430 may be performed based on comparing the other parameter or other measurement to the corresponding threshold value (e.g., as well as the comparison of 410). In such cases, the indication of the parameter at 405 may include an indication of one of the parameters that indicates a higher level of degradation (e.g., a worst-case parameter) or may include an indication of multiple parameters (e.g., both parameters, including the worst-case parameter).

At 425, the host device 105-*a* may communicate an indication for operating the memory device based on determining the second parameter. For example, the host device 105-*a* may, at least in part, implement or notify the memory device 110-*a* of the determined second parameter for operating the memory device 110-*a*. Communicating the indication for operating the memory device 110-*a* may include transmitting an access command to the memory device 110-*a*, or another memory device 110 (not shown). The access command may include the second parameter, or may otherwise be determined according to the second parameter.

In some examples, at 430, the memory device 110-*a* may adjust one or more parameters based on receiving (e.g., from the host device 105-*a*) the indication for operating the memory device 110-*a*. The one or more parameters may, for example, be associated with a temperature of the memory device 110-*a*, a refresh rate of the memory device 110-*a*, a voltage level of the memory device 110-*a*, an access parameter of the memory device 110-*a*, any other parameter described herein, or any combination thereof.

In some examples, at 435, the host device 105-*a* may transmit an indication of a status of the memory device 110-*a* to a device different than the memory device (e.g., based on the indication of 425). The indication of the status may be transmitted to a device or component of a system including the memory device 110-*a* and the host device 105-*a*. In such cases, the indication of the status may be used by an operator or designer of the system or of the memory device 110-*a* for design of the system or design of an associated memory device 110. The indication of the status may indicate (e.g., to a user or system designer) that the memory device 110-*a* should be repaired or replaced, or that the memory device 110-*a* has reached a threshold level (e.g., an accelerated level) of degradation or impaired operation, among other indications. Such indications may an output of an indication to a system or a device, such as a check engine light or other dash indication of a device, such as a vehicle, that includes the system, or an indicator displayed by a computing system that includes the system, among other indications, options, and examples.

Figure 5:
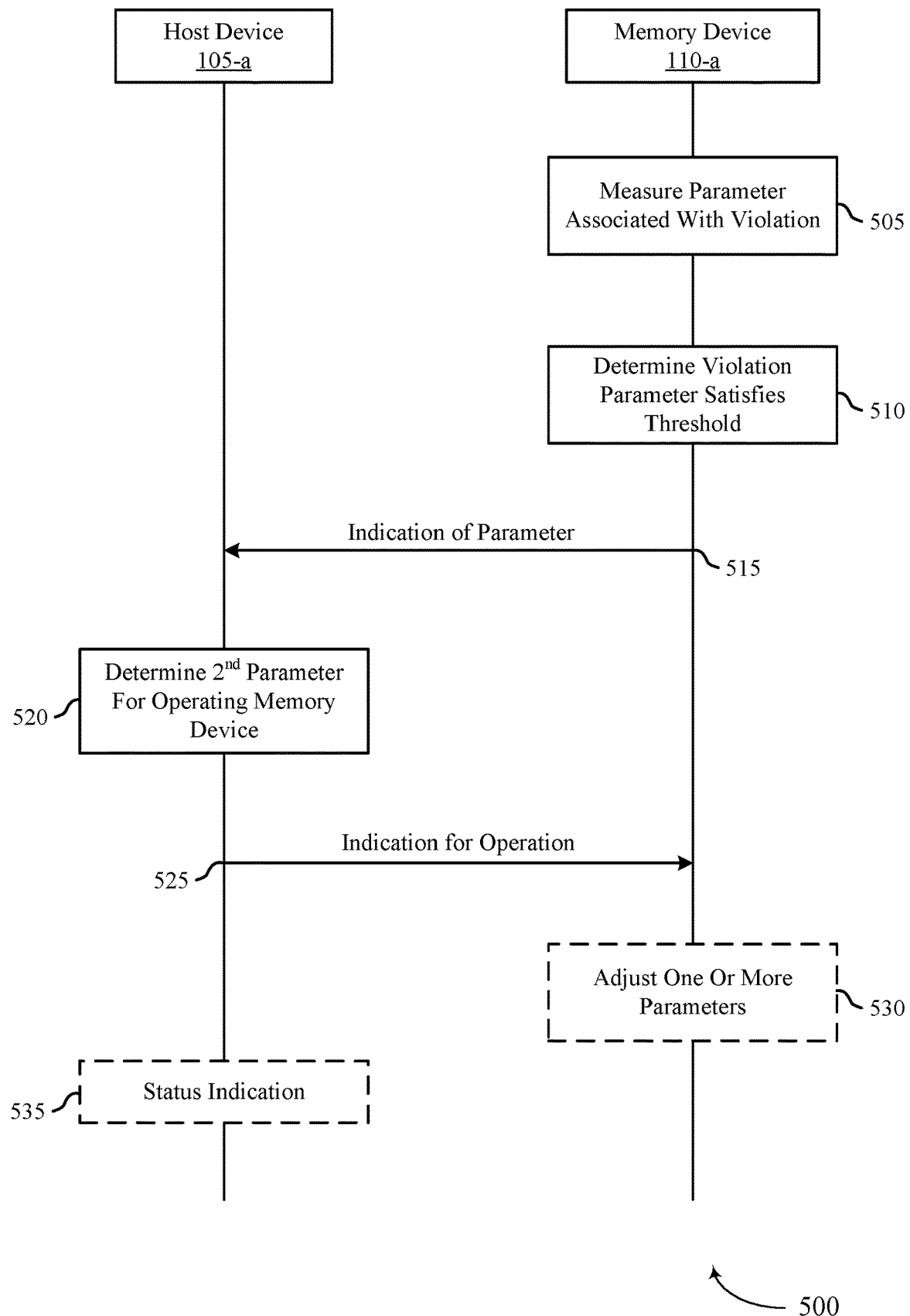
FIG. 5 illustrates an example of a process flow that supports life expectancy monitoring for memory devices in accordance with examples as disclosed herein.

FIG. 5 illustrates an example of a process flow 500 and associated operations and signaling that support life expectancy monitoring for memory devices in accordance with examples as disclosed herein. The process flow 500 may include a host device 105-*b* and a memory device 110-*b*, which may be examples of the respective devices described with reference to FIGS. 1-4. The host device 105-*b* and the memory device 110-*b* may be coupled via a physical or logical interface, such as channels 115, that may support signaling between the respective devices. The memory device 110-*b* may illustrate an example of an apparatus that includes an array of memory cells 205 couplable to an interface with a processor or SoC (e.g., of the host device 105-*b*) and configured to operate in response to commands from the processor or the SoC.

The memory device 110-*b* may include logic or circuitry (e.g., a monitoring circuit 156, one or more monitoring circuits 166, one or more monitoring circuits 261, or various combinations thereof) for monitoring one or more parameters associated with a violation of an operating parameter of the memory device 110-*b*. The logic or circuitry may be attached to a same substrate, for example, as the array of memory cells 205, which may be configured to support various operations described herein. In some examples, the array of memory cells 205 of the memory device 110-*b* may be volatile memory cells, and the memory device 110-*b* may further include a non-volatile storage component (e.g., one or more non-volatile memory cells, latches, fuses or anti-fuses) configured to store an indication of a violation of an operating parameter of the memory device 110-*b*.

At 505, the memory device 110-*b* may measure a parameter associated with a component of the memory device 110-*b*. The parameter may be associated, for example, with a violation of an operating parameter of the component (e.g., a violation of an operating parameter specified by a data sheet of the memory device 110-*b*). The memory device 110-*b* may be configured to monitor all operating parameters for a violation, or may be configured to monitor a subset (e.g., one or more) of operating parameters for a violation. In some cases, the parameter may be associated with a problematic command sequence (e.g., that may cause malfunction or degradation of the memory device 110-*b* if overused) or another operation of the memory device 110-*b* that may cause, be, or indicate a malfunction. The examples described herein in relation to a violation of an operating parameter may also apply to the problematic command sequence or the operation of the memory device 110-*b*.

The violation of an operating parameter of the component may be associated with a type of violation, such as a non-destructive violation or a destructive violation, among other options.

A non-destructive violation may include, for example, a violation of an operating parameter for the memory device 110-*b* that does not result in damage or degradation to a component of the memory device 110-*b*. Such violations may be associated with a quality of service of the memory device 110-*b* (e.g., associated with one or more error rates, such as a bit error rate), for example, as opposed to a malfunction or degradation of the memory device 110-*b*. Examples of a non-destructive violation may include a violation of a timing parameter of the memory device 110-*b* or a violation of a low-end voltage (e.g., voltage-in low) of the memory device 110-*b*. For example, a voltage-in low operating parameter may be set at 400 millivolts (mV) and a violation of the operating parameter may include supplying 450 mV.

When associated with a non-destructive violation, the parameter may represent a clock based parameter (e.g., a timing parameter), a time based parameter (e.g., a timing duration parameter), a quantity of violations (e.g., a long term tracking of non-destructive violations), or any combination thereof. The memory device 110-*b* may include one or more counters (e.g., simple counters, counters coupled to a clock rate) to measure or determine the clock based parameter, the time based parameter, the quantity of violations, or any combination thereof.

A destructive violation may include, for example, a violation of an operating parameter for the memory device 110-*b* that may result in damage or degradation to a component of the memory device 110-*b* (e.g., accelerated or increased wear-out, or destruction). Such violations may be associated with a wear-out or life expectancy of the memory device 110-*b*. Examples of a destructive violation may include an excessive power, temperature, or voltage (e.g., a power supply voltage or a voltage-in high voltage) applied to the component of the memory device 110-*b*, which may be recorded using a fuse, among other examples. In one example, a voltage-in high operating parameter may be set at 2 volts (V) and a violation of the operating parameter may include supplying 6 V. In another example, a violation of a row active time (e.g., going beyond an operating parameter of row active time) may increase wear-out of associated components.

The memory device 110-*b* may track (e.g., using the monitoring circuitry by storing, determining, or otherwise capturing) a quantity of times, a length, a magnitude, or any combination thereof, associated with a destructive violation (e.g., a temperature or voltage violation). For example, the memory device 110-*b* may track a quantity of times, a length, and/or a magnitude of a row active time violation. In some cases, the length of a violation may be tracked using different granularities for different violations or for different intervals, where a user (e.g., a system designer or user of the host device 105-*b*) may have an option to select a granularity interval.

At 510, the memory device 110-*b* may determine that the parameter satisfies a threshold based on a comparison of the parameter with the threshold. For example, the memory device 110-*b* may determine that an operating parameter associated with the component satisfies a corresponding threshold, where the threshold may represent a violation of the operating parameter or may represent a beginning of or location within a guard band (e.g., a range of values) from violating the operating parameter. In some cases, the threshold may be set or selected by a user of the memory device 110-*b* (e.g., a user of the host device 105-*b* or a system operator, programmer, or designer).

In some examples, the comparison of 510 may be associated with (e.g., followed by or support) determining an estimated remaining life (e.g., life expectancy) of the memory device 110-*b*, or that an estimate of remaining life of the memory device 110-*b* satisfies a threshold of remaining life. For example, the memory device 110-*b* may determine a remaining life or life expectancy based on a violation of a destructive operating parameter (e.g., using parameter data associated with the violation).

In some examples, the operations at 505, or 510, or both, may be performed or initiated on a periodic basis (e.g., according to a duration of operation, according to a quantity of access operations, according to a monitoring interval). In some examples, the operations at 505, or 510, or both, may be triggered by a condition at the host device 105-*b* or the memory device 110-*b* (e.g., triggered at a power cycle, triggered at a time of day, triggered at a deep power-down operation, triggered upon entering or exiting a power mode, triggered based on an access pattern, triggered upon a detection of a row hammer condition). In some examples, evaluation intervals or initiation conditions may be changed over time, such as shortening a testing interval based on a duration of operation, or a detected remaining life expectancy (e.g., based on flag bits). For example, if the memory device 110-*b* identifies an accelerated degradation or threshold life expectancy, a monitoring or evaluation interval may be shortened to support more frequent evaluation of the memory device 110-*b*.

At 515 (e.g., and as part of, or otherwise based on determining that the parameter satisfies the threshold), the memory device 110-*b* may communicate an indication that the parameter satisfies the threshold to the host device 105-*b*. The indication may be a proactive indication transmitted by the memory device 110-*b*, or may be in response to the memory device 110-*b* receiving a polling request from the host device 105-*b* (e.g., polling a mode register or other register of the memory device 110-*b*). In some cases, the memory device 110-*a* may proactively indicate for the host device 105-*a* to read the register storing the indication. For example, upon determining a violation of the operating parameter (e.g., satisfying the threshold) the memory device 110-*b* may store information in the register (e.g., one or more register bits) and may point to register bits to be checked by the host device 105-*b* (e.g., bits associated with monitoring the parameter).

The indication may include an indication of the type of the violation, such as indicating a destructive violation or a non-destructive violation (e.g., associated with the parameter). In some cases of a non-destructive violation, the indication that the parameter satisfies the threshold may indicate that the violation is not damaging the component or the memory device 110-*b* (e.g., not adversely affecting the component). Such an indication may also indicate that there may be less margin for operating the component based on the non-destructive violation and may further indicate a possibility of future failures (e.g., indicate that failures may occur in some situations, such as in the presence of ground noise). In some cases, the indication may indicate a magnitude of the violation (e.g., an amount beyond the operating parameter or threshold) or may indicate a margin between the parameter and the violation (e.g., may indicate a percentage range from the violation, such as 10 percent to violation).

The indication may additionally or alternatively include a severity (e.g., a level or magnitude) of the violation, where the indication itself may be based on the severity. For example, a repeated occurrence of a violation or an estimated decrease in device lifetime may be more severe than a one-time voltage violation. In such cases, the indication may indicate a characteristic of the violation (e.g., a one-time or repeated violation) or may indicate a severity level of the violation. In some cases, as described with reference to FIG. 4, the indication may include one or more suggested actions for the host device 105-b. For example, the indication may indicate one or more suggested actions to take in order to reduce or eliminate the violation of the operating parameter.

In some cases, the indication that the parameter satisfies the threshold may include an indication of a life expectancy of the memory device 110-b. For example, the indication may include an estimated percentage of remaining life of the memory device 110-b, or an estimated duration of remaining life of the memory device 110-b, or an indication that an estimate of remaining life of the memory device 110-b satisfies a threshold of remaining life. In some cases, the life expectancy of the memory device 110-b may be based on information associated with the violation of the operating parameter (e.g., based on a destructive violation and associated information). For example, upon identification of a destructive violation, information associated with the violation (e.g., the parameter value) may be fed back to life expectancy estimation circuitry for improved estimation of the life expectancy.

In some examples, the indication may include sensor signal levels associated with measuring the parameter or may include an indication of the parameter (e.g., a parameter value), or both, which may support the host device 105-b performing various calculations or evaluations based on such signal levels or the parameter value (e.g., the host device 105-b may include one or more comparators or other evaluation logic or circuitry for performing the calculations or evaluations).

At 520, the host device 105-b may determine a second parameter for operating the memory device 110-b (e.g., based on the indication of the parameter or the life expectancy of the memory device 110-b, or both). In some examples, the second parameter may be related to one or more access operations on the memory device 110-b (e.g., determining or adjusting a voltage or timing parameter for accessing the memory device 110-b). The second parameter may, in some cases, be related to the violation of the operating parameter. For example, the second parameter may be determined by the host device 105-b in order to reduce or eliminate the violation of the operating parameter or to adjust a parameter associated with or affected by the violation of the operating parameter.

In some examples, the determination of the second parameter may include determining which of a set of memory devices 110 or memory arrays 170 (e.g., including the memory device 110-b) to use for an access operation. For example, the host device 105-b may determine to refrain from performing an access operation on the memory device 110-b, or determine to perform an access operation on a different memory device 110. In some examples, determining the second parameter may include determining an estimated life expectancy parameter associated with an age or operating history of the memory device 110-b, and determining the second parameter based on comparing information from the indication to the estimated life expectancy parameter (e.g., based on a determination of whether the memory device 110-b is degrading more quickly or more slowly than expected).

In some cases, the indication may include one or more suggested actions for the host device 105-b to take (e.g., associated with the second parameter). For example, one bit of a mode register of the memory device 110-b may be interpreted by the host device 105-b as an indication to throttle (e.g., slow down, reduce) a clock rate, such as lengthening a duration or period of a clock signal. Another bit of a mode register may be interpreted by the host device 105-b as an indication to use a power-down mode more often, which may occur at the expense of performance or latency. Another bit of a mode register may be interpreted by the host device 105-b as an indication to change an address scheme (e.g., if possible), such as accessing a different memory array 170, or accessing a different pattern of memory cells 205. Thus, according to these and other examples, the memory device 110-b may use a mode register to support signaling to the host device 105-b one or more suggested actions (e.g., to perform for dynamic adjustment).

In some examples, the host device 105-b may determine to adjust a voltage parameter of the memory device 110-b (e.g., a voltage source level, a read or write bias, a reference voltage level), a timing parameter of the memory device 110-b (e.g., a duration or rate of performing access operations or portion thereof, a refresh interval, an idle duration), or both. In some examples, the host device 105-b or the memory device 110-b may identify a circuit slow-down, and the host device 105-b may determine to remedy the slow-down by increasing a voltage for performing subsequent access operations (e.g., adding 100 mV to a voltage supply circuit).

In another example, degradation may be related to duty cycle, such as an excessive timing skew. In such examples, the host device 105-b may enable or disable delay components to re-center timing. In some examples, the host device 105-b may enable a redundant circuit (e.g., disabling a first circuit component or memory array 170 and enabling a second circuit component or memory array 170). In some examples, the host device 105-b may adapt a sensor or corresponding signal on a signal line of the memory device 110-b, or adapt a threshold source or corresponding signal on a threshold line of the memory device 110-b (e.g., enabling a different threshold source), so that a comparator does not continue to flag the parameter as satisfying the threshold.

Although illustrated in the context of a response to a single parameter or single parameter measurement (e.g., at 505), in some examples, the described techniques may be performed in response to more than one parameter or associated evaluation. For example, the memory device 110-b or the host device 105-b may identify another parameter or another measurement of the parameter, and may compare the other parameter or other measurement to a corresponding threshold value additionally or alternatively. In such examples, the operations at 530 may be performed based on comparing the other parameter or other measurement to the corresponding threshold value (e.g., as well as the comparison of 510).

At 525, the host device 105-b may communicate an indication for operating the memory device based on determining the second parameter. For example, the host device 105-b may, at least in part, implement or notify the memory device 110-b of the determined second parameter for operating the memory device 110-b. Communicating the indication for operating the memory device 110-b may include transmitting an access command to the memory device 110-*b*, or another memory device 110 (not shown). The access command may include the second parameter, or may otherwise be determined according to the second parameter.

In some examples, at 530, the memory device 110-*b* may adjust one or more parameters (e.g., operating parameters) based on receiving the indication for operating the memory device 110-*b*. The one or more parameters may, for example, be associated with a temperature of the memory device 110-*b*, a refresh rate of the memory device 110-*b*, a voltage level of the memory device 110-*b*, an access parameter of the memory device 110-*b*, any other parameter described herein, or any combination thereof.

In some examples, at 535, the host device 105-*b* may transmit an indication of a status of the memory device 110-*b* to a device different than the memory device (e.g., based on the indication of 425). In some examples, the indication of the status may be transmitted to a device or component of a system including the memory device 110-*b* and the host device 105-*b*. In such cases, the indication of the status may be used by an operator or designer of the system or of the memory device 110-*b* for design of the system or an associated memory device 110. In some cases, the indication of the status may be used to track a quantity of operating parameter violations, which may be stored for evaluation of the system. For example, the tracked operating parameter violations may be used to understand exposure of the system to errors and degradation, as well as to quantify risks associated with current or future operating parameter violations. The tracked operating parameter violations may also be used to determine a cause of device failure or malfunction.

The indication of the status may indicate (e.g., to a user or system designer) that the memory device 110-*b* should be repaired or replaced, or that the memory device 110-*b* has reached a threshold level (e.g., an accelerated level) of degradation or impaired operation, among other indications. Such indications may include a check engine light or other dash indication of a vehicle that includes the system, or an indicator displayed by a computing system that includes the system, among other indications.

Figure 6:
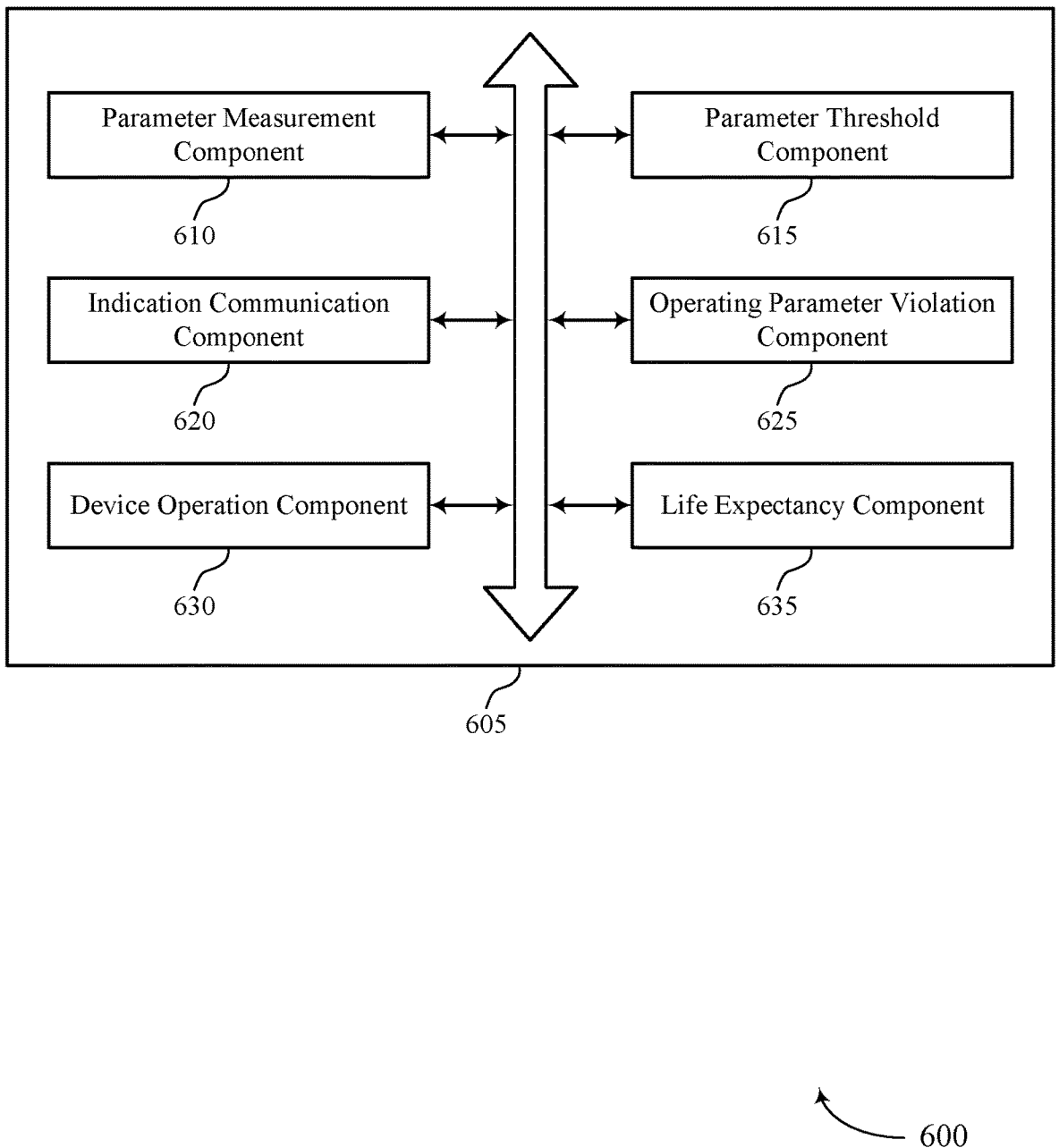
FIG. 6 shows a block diagram of a memory device that supports life expectancy monitoring for memory devices in accordance with examples as disclosed herein.

FIG. 6 shows a block diagram 600 of a memory device 605 that supports life expectancy monitoring for memory devices in accordance with examples as disclosed herein. The memory device 605 may be an example of aspects of a memory device as described with reference to FIGS. 1-5. The memory device 605 may include a parameter measurement component 610, a parameter threshold component 615, an indication communication component 620, an operating parameter violation component 625, a device operation component 630, and a life expectancy component 635. Each of these modules may communicate, directly or indirectly, with one another (e.g., via one or more buses).

The parameter measurement component 610 may measure, at a memory device, a parameter associated with a component of the memory device, the parameter associated with a level of wear of the component, a violation of an operating parameter of the component, or both. The parameter threshold component 615 may determine that the parameter satisfies a threshold based on a comparison of the parameter with the threshold.

The indication communication component 620 may communicate, to a host device, an indication that the parameter satisfies the threshold based on the determining. In some examples, the indication communication component 620 may communicate an indication of one or more suggested actions for operating the memory device based on determining that the parameter satisfies the threshold.

The operating parameter violation component 625 may determine a type of the violation of the operating parameter of the component, the type including one of a non-destructive violation or a destructive violation. In some examples, the operating parameter violation component 625 may communicate an indication of the type of the violation of the operating parameter, where the threshold includes a threshold violation of the operating parameter for the component.

In some examples, the operating parameter violation component 625 may determine a severity of the violation of the operating parameter. In some examples, the operating parameter violation component 625 may communicate an indication of the severity of the violation of the operating parameter. In some examples, the operating parameter violation component 625 may determine a quantity of violations associated with the violation of the operating parameter, a magnitude associated with the violation of the operating parameter, or a duration associated with the violation of the operating parameter, or any combination thereof. In some examples, the operating parameter violation component 625 may communicate an indication of the quantity, the magnitude, or the duration, or any combination thereof.

In some examples, the operating parameter violation component 625 may determine a life expectancy of the memory device based on the parameter satisfying the threshold violation of the operating parameter, where the indication that the parameter satisfies the threshold includes an indication of the life expectancy. In some cases, the threshold violation of the operating parameter includes a threshold within a guard band of the violation of the operating parameter. In some cases, the non-destructive type of violation is associated with an error rate of the memory device, and where the destructive type of violation is associated with an increase in a degradation of the component.

The device operation component 630 may receive, from the host device, an indication for operating the memory device based on communicating the indication that the parameter satisfies the threshold. In some examples, the device operation component 630 may adjust, based on receiving the indication for operating the memory device, one or more parameters associated with a temperature of the memory device, a refresh rate of the memory device, a voltage level of the memory device, or any combination thereof.

The life expectancy component 635 may communicate an indication of a life expectancy of the memory device, where the threshold includes a level of wear of the component that is associated with the life expectancy of the memory device. In some examples, the life expectancy component 635 may communicate an indication of a rate of degradation of the component that is based on the level of wear of the component, where the threshold includes a threshold rate of degradation of the component. In some examples, the life expectancy component 635 may communicate one or more bits that indicate the rate of degradation satisfies the threshold, or an amount of use of the component based on the rate of degradation, or both. In some cases, the threshold level of wear includes a threshold within a guard band of a range of values associated with an end of life of the memory device.

Figure 7:
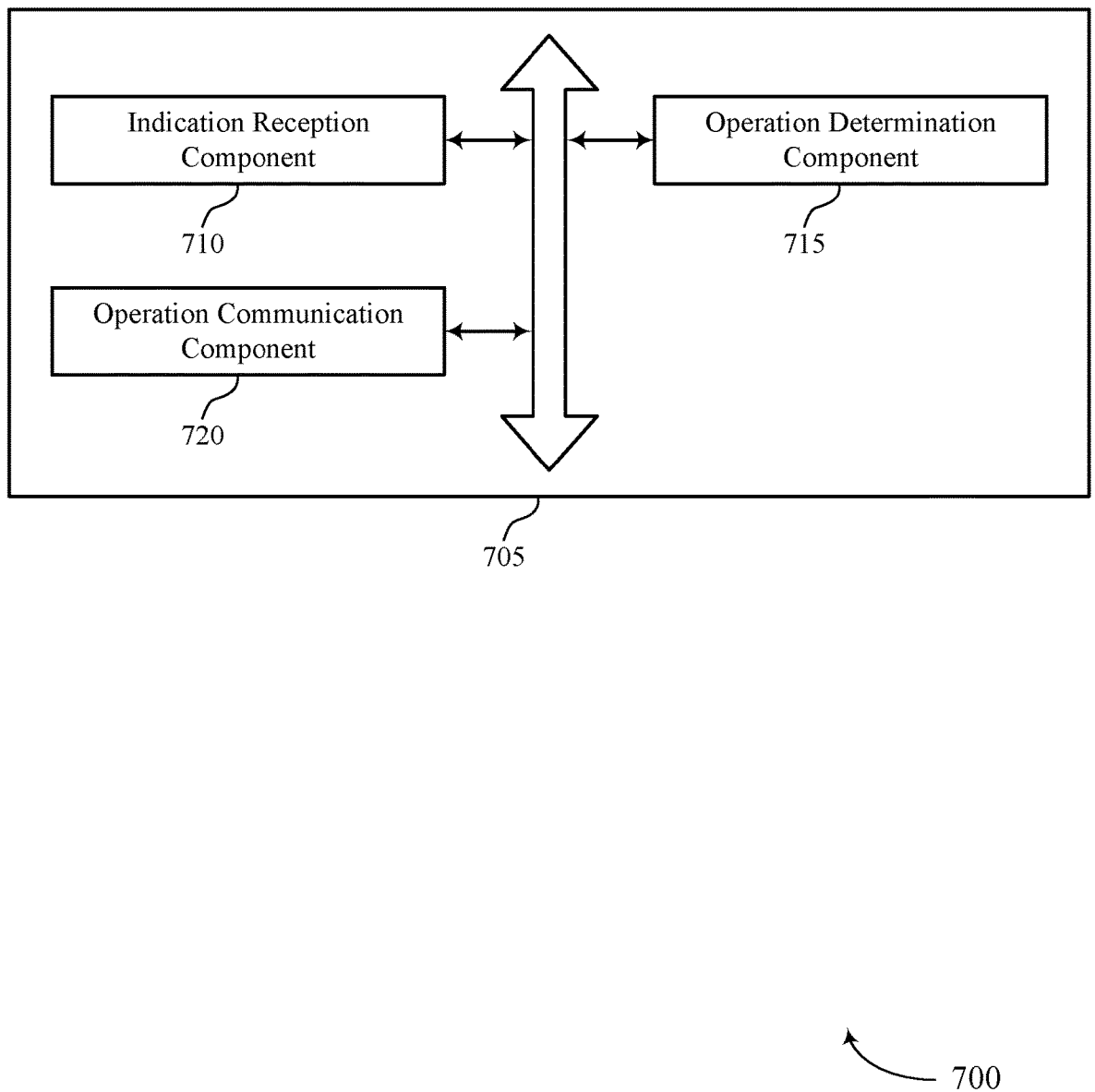
FIG. 7 shows a block diagram of a host device that supports life expectancy monitoring for memory devices in accordance with examples as disclosed herein.

FIG. 7 shows a block diagram 700 of a host device 705 that supports life expectancy monitoring for memory devices in accordance with examples as disclosed herein. The host device 705 may be an example of aspects of a host device as described with reference to FIGS. 1-5. The host device 705 may include an indication reception component 710, an operation determination component 715, and an operation communication component 720. Each of these modules may communicate, directly or indirectly, with one another (e.g., via one or more buses).

The indication reception component 710 may receive, from a memory device, an indication that a first parameter associated with a component of the memory device has satisfied a threshold, the first parameter associated with a level of wear of the component, a violation of an operating parameter of the component, or both. In some examples, the indication reception component 710 may receive an indication of a life expectancy of the memory device, where the threshold includes a level of wear of the component that is associated with the life expectancy of the memory device.

In some examples, the indication reception component 710 may receive an indication of a rate of degradation of the component that is based on the level of wear of the component, where the threshold includes a threshold rate of degradation of the component. In some examples, the indication reception component 710 may receive an indication of a type of the violation of the operating parameter of the component, the type including one of a non-destructive violation or a destructive violation, where the threshold includes a threshold violation of the operating parameter for the component.

In some examples, the indication reception component 710 may receive an indication of a severity associated with the violation of the operating parameter, a quantity of violations associated with the violation of the operating parameter, a magnitude associated with the violation of the operating parameter, or a duration associated with the violation of the operating parameter, or any combination thereof. In some examples, the indication reception component 710 may receive an indication of one or more suggested actions for operating the memory device.

The operation determination component 715 may determine a second parameter for operating the memory device based on receiving the indication that the first parameter has satisfied the threshold. In some examples, the operation determination component 715 may determine to adjust one or more parameters associated with a temperature of the memory device, a refresh rate of the memory device, a voltage level of the memory device, or any combination thereof, the indication for operating the memory device indicative of the one or more parameters.

The operation communication component 720 may communicate, to the memory device, an indication for operating the memory device based on the determining.

Figure 8:
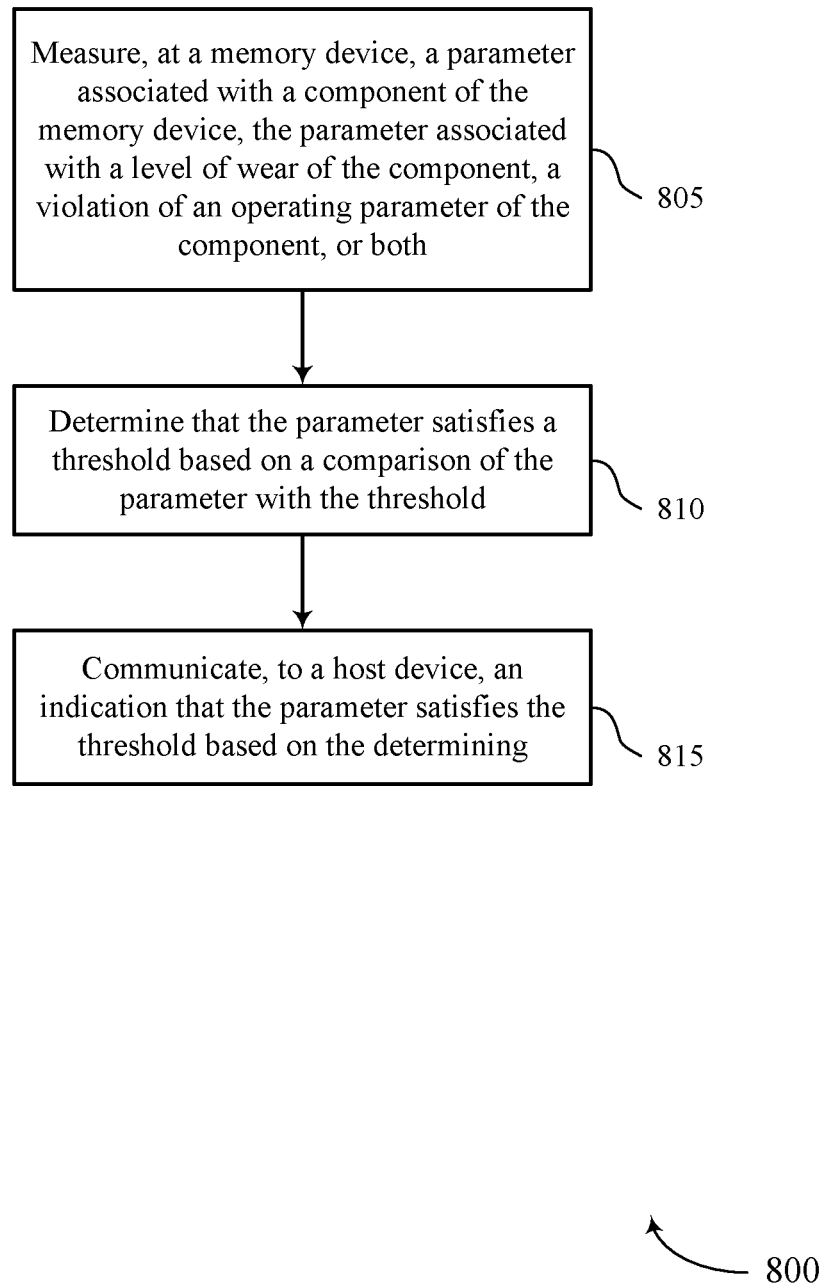
FIGS. 8 and 9 show flowcharts illustrating a method or methods that support life expectancy monitoring for memory devices in accordance with examples as disclosed herein.

FIG. 8 shows a flowchart illustrating a method or methods 800 that supports life expectancy monitoring for memory devices in accordance with examples as disclosed herein. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the memory device may measure, at a memory device, a parameter associated with a component of the memory device, the parameter associated with a level of wear of the component, a violation of an operating parameter of the component, or both. The operations of 805 may be performed according to the methods described with reference to FIGS. 4 and 5. In some examples, aspects of the operations of 805 may be performed by a parameter measurement component as described with reference to FIG. 6.

At 810, the memory device may determine that the parameter satisfies a threshold based on a comparison of the parameter with the threshold. The operations of 810 may be performed according to the methods described with reference to FIGS. 4 and 5. In some examples, aspects of the operations of 810 may be performed by a parameter threshold component as described with reference to FIG. 6.

At 815, the memory device may communicate, to a host device, an indication that the parameter satisfies the threshold based on the determining. The operations of 815 may be performed according to the methods described with reference to FIGS. 4 and 5. In some examples, aspects of the operations of 815 may be performed by an indication communication component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for measuring, at a memory device, a parameter associated with a component of the memory device, the parameter associated with a level of wear of the component, a violation of an operating parameter of the component, or both, determining that the parameter satisfies a threshold based on a comparison of the parameter with the threshold, and communicating, to a host device, an indication that the parameter satisfies the threshold based on the determining.

Some examples of the method 800 and the apparatus described herein may further include operations, features, means, or instructions for communicating an indication of a life expectancy of the memory device, where the threshold includes a level of wear of the component that may be associated with the life expectancy of the memory device. In some examples of the method 800 and the apparatus described herein, the threshold level of wear includes a threshold within a guard band of a range of values associated with an end of life of the memory device.

Some examples of the method 800 and the apparatus described herein may further include operations, features, means, or instructions for communicating an indication of a rate of degradation of the component that may be based on the level of wear of the component, where the threshold includes a threshold rate of degradation of the component. In some examples of the method 800 and the apparatus described herein, communicating the rate of degradation may include operations, features, means, or instructions for communicating one or more bits that indicate the rate of degradation satisfies the threshold, or an amount of use of the component based on the rate of degradation, or both.

Some examples of the method 800 and the apparatus described herein may further include operations, features, means, or instructions for determining a type of the violation of the operating parameter of the component, the type including one of a non-destructive violation or a destructive violation, and communicating an indication of the type of the violation of the operating parameter, where the threshold includes a threshold violation of the operating parameter for the component. Some examples of the method 800 and the apparatus described herein may further include operations, features, means, or instructions for determining a severity of the violation of the operating parameter, and communicating an indication of the severity of the violation of the operating parameter.

Some examples of the method 800 and the apparatus described herein may further include operations, features, means, or instructions for determining a quantity of violations associated with the violation of the operating parameter, a magnitude associated with the violation of the operating parameter, or a duration associated with the violation of the operating parameter, or any combination thereof, and communicating an indication of the quantity, the magnitude, or the duration, or any combination thereof.

Some examples of the method 800 and the apparatus described herein may further include operations, features, means, or instructions for determining a life expectancy of the memory device based on the parameter satisfying the threshold violation of the operating parameter, where the indication that the parameter satisfies the threshold includes an indication of the life expectancy. In some examples of the method 800 and the apparatus described herein, the threshold violation of the operating parameter includes a threshold within a guard band of the violation of the operating parameter. In some examples of the method 800 and the apparatus described herein, the non-destructive type of violation may be associated with an error rate of the memory device, and where the destructive type of violation may be associated with an increase in a degradation of the component.

Some examples of the method 800 and the apparatus described herein may further include operations, features, means, or instructions for communicating an indication of one or more suggested actions for operating the memory device based on determining that the parameter satisfies the threshold. Some examples of the method 800 and the apparatus described herein may further include operations, features, means, or instructions for receiving, from the host device, an indication for operating the memory device based on communicating the indication that the parameter satisfies the threshold. Some examples of the method 800 and the apparatus described herein may further include operations, features, means, or instructions for adjusting, based on receiving the indication for operating the memory device, one or more parameters associated with a temperature of the memory device, a refresh rate of the memory device, a voltage level of the memory device, or any combination thereof.

Figure 9:
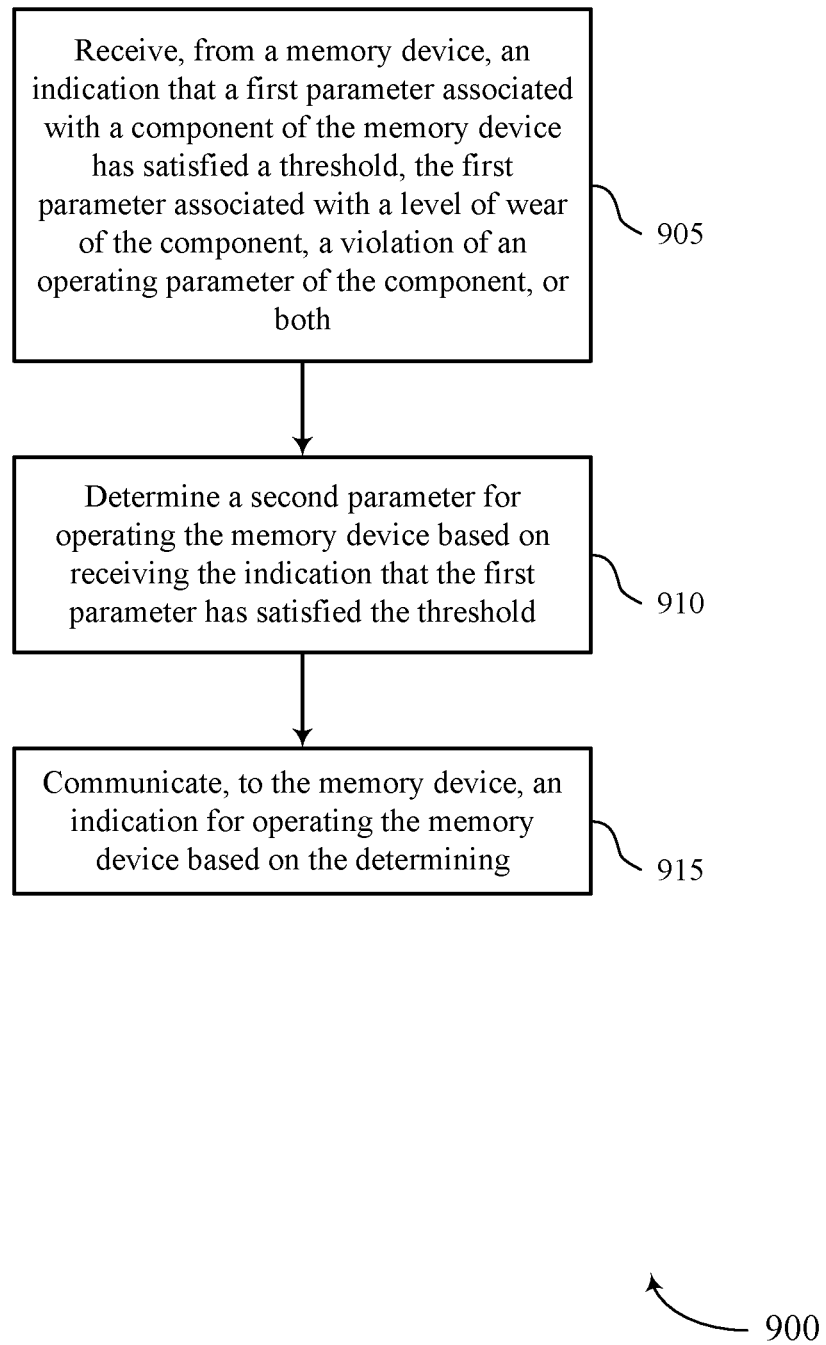

FIG. 9 shows a flowchart illustrating a method or methods 900 that supports life expectancy monitoring for memory devices in accordance with examples as disclosed herein. The operations of method 900 may be implemented by a host device or its components as described herein. For example, the operations of method 900 may be performed by a host device as described with reference to FIG. 7. In some examples, a host device may execute a set of instructions to control the functional elements of the host device to perform the described functions. Additionally or alternatively, a host device may perform aspects of the described functions using special-purpose hardware.

At 905, the host device may receive, from a memory device, an indication that a first parameter associated with a component of the memory device has satisfied a threshold, the first parameter associated with a level of wear of the component, a violation of an operating parameter of the component, or both. The operations of 905 may be performed according to the methods described with reference to FIGS. 4 and 5. In some examples, aspects of the operations of 905 may be performed by an indication reception component as described with reference to FIG. 7.

At 910, the host device may determine a second parameter for operating the memory device based on receiving the indication that the first parameter has satisfied the threshold. The operations of 910 may be performed according to the methods described with reference to FIGS. 4 and 5. In some examples, aspects of the operations of 910 may be performed by an operation determination component as described with reference to FIG. 7.

At 915, the host device may communicate, to the memory device, an indication for operating the memory device based on the determining. The operations of 915 may be performed according to the methods described with reference to FIGS. 4 and 5. In some examples, aspects of the operations of 915 may be performed by an operation communication component as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for receiving, from a memory device, an indication that a first parameter associated with a component of the memory device has satisfied a threshold, the first parameter associated with a level of wear of the component, a violation of an operating parameter of the component, or both, determining a second parameter for operating the memory device based on receiving the indication that the first parameter has satisfied the threshold, and communicating, to the memory device, an indication for operating the memory device based on the determining.

Some examples of the method 900 and the apparatus described herein may further include operations, features, means, or instructions for receiving an indication of a life expectancy of the memory device, where the threshold includes a level of wear of the component that may be associated with the life expectancy of the memory device. Some examples of the method 900 and the apparatus described herein may further include operations, features, means, or instructions for receiving an indication of a rate of degradation of the component that may be based on the level of wear of the component, where the threshold includes a threshold rate of degradation of the component.

Some examples of the method 900 and the apparatus described herein may further include operations, features, means, or instructions for receiving an indication of a type of the violation of the operating parameter of the component, the type including one of a non-destructive violation or a destructive violation, where the threshold includes a threshold violation of the operating parameter for the component.

Some examples of the method 900 and the apparatus described herein may further include operations, features, means, or instructions for receiving an indication of a severity associated with the violation of the operating parameter, a quantity of violations associated with the violation of the operating parameter, a magnitude associated with the violation of the operating parameter, or a duration associated with the violation of the operating parameter, or any combination thereof. Some examples of the method 900 and the apparatus described herein may further include operations, features, means, or instructions for receiving an indication of one or more suggested actions for operating the memory device.

In some examples of the method 900 and the apparatus described herein, determining the second parameter for operating the memory device may include operations, features, means, or instructions for determining to adjust one or more parameters associated with a temperature of the memory device, a refresh rate of the memory device, a voltage level of the memory device, or any combination thereof, the indication for operating the memory device indicative of the one or more parameters.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array including a set of memory cells and circuitry coupled with the memory array and operable to measure, at a memory device, a parameter associated with a component of the memory device, the parameter associated with a level of wear of the component, a violation of an operating parameter of the component, or both, determine that the parameter satisfies a threshold based on a comparison of the parameter with the threshold, and communicate, to a host device, an indication that the parameter satisfies the threshold based on the determining.

Some examples of the circuitry may further be operable to communicate an indication of a life expectancy of the apparatus, where the threshold includes a level of wear of the component that may be associated with the life expectancy of the apparatus. Some examples of the circuitry may further be operable to communicate an indication of a rate of degradation of the component that may be based on the level of wear of the component, where the threshold includes a threshold rate of degradation of the component.

Some examples of the circuitry may further be operable to determine a type of the violation of the operating parameter of the component, the type including one of a non-destructive violation or a destructive violation, and communicate an indication of the type of the violation of the operating parameter, where the threshold includes a threshold violation of the operating parameter for the component. Some examples of the apparatus may include one or more counters configured to determine a quantity of violations associated with the violation of the operating parameter or a duration associated with the violation of the operating parameter, or both, the indication including an indication of the quantity or the duration, or both.

Some examples of the circuitry may further be operable to receive, from the host device, an indication for operating the apparatus based on communicating the indication that the parameter satisfies the threshold.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method, comprising:
measuring, at a memory device, a parameter associated with a component of the memory device, the parameter associated with a level of wear of the component, a violation of an operating parameter of the component, or both;
determining that the parameter satisfies a threshold based at least in part on a comparison of the parameter with the threshold, wherein the threshold comprises a threshold violation of the operating parameter;
classifying, at the memory device, a type of the violation of the operating parameter of the component as a non-destructive violation or a destructive violation;
communicating, to a host device, an indication that the parameter satisfies the threshold based at least in part on determining that the parameter satisfies the threshold, the indication comprising the classified type of the violation of the operating parameter;
receiving, from the host device, a second indication for operating the memory device based at least in part on communicating the indication that the parameter satisfies the threshold; and
adjusting, based at least in part on receiving the second indication for operating the memory device, one or more parameters associated with operating the memory device.

2. The method of claim 1, wherein communicating the indication comprises:
communicating an indication of a life expectancy of the memory device, wherein the threshold comprises a level of wear of the component that is associated with the life expectancy of the memory device.

3. The method of claim 2, wherein the level of wear comprises a threshold within a guard band of a range of values associated with an end of life of the memory device.

4. The method of claim 1, wherein communicating the indication comprises:
communicating an indication of a rate of degradation of the component that is based at least in part on the level of wear of the component, wherein the threshold comprises a threshold rate of degradation of the component.

5. The method of claim 4, wherein communicating the rate of degradation comprises:
communicating one or more bits that indicate the rate of degradation satisfies the threshold, or an amount of use of the component based at least in part on the rate of degradation, or both.

6. The method of claim 1, further comprising:
classifying, at the memory device, a severity of the violation of the operating parameter, the severity comprising one of a plurality of levels, wherein communicating the indication comprises:
communicating an indication of the classified severity of the violation of the operating parameter.

7. The method of claim 1, further comprising:
determining a quantity of violations associated with the violation of the operating parameter, a magnitude associated with the violation of the operating parameter, or a duration associated with the violation of the operating parameter, or any combination thereof, wherein communicating the indication comprises:
communicating an indication of the quantity of violations associated with the violation of the operating parameter, the magnitude associated with the violation of the operating parameter, or the duration associated with the violation of the operating parameter, or any combination thereof.

8. The method of claim 1, further comprising:
determining a life expectancy of the memory device based at least in part on the parameter satisfying the threshold violation of the operating parameter, wherein the indication that the parameter satisfies the threshold comprises an indication of the life expectancy.

9. The method of claim 1, wherein the threshold violation of the operating parameter comprises a threshold within a guard band of the violation of the operating parameter.

10. The method of claim 1, wherein the non-destructive violation is associated with an error rate of the memory device, and wherein the destructive violation is associated with an increase in a degradation of the component.

11. The method of claim 1, wherein communicating the indication comprises:
communicating an indication of one or more suggested actions for operating the memory device based at least in part on determining that the parameter satisfies the threshold.

12. The method of claim 1, wherein adjusting the one or more parameters associated with operating the memory device comprises:
adjusting one or more parameters associated with a temperature of the memory device, a refresh rate of the memory device, a voltage level of the memory device, or any combination thereof.

13. A memory device, comprising:
one or more memory arrays each comprising a plurality of memory cells; and
circuitry coupled with the one or more memory arrays and operable to:
measure a parameter associated with a component of the memory device, the parameter associated with a level of wear of the component, a violation of an operating parameter of the component, or both;
determine that the parameter satisfies a threshold based at least in part on a comparison of the parameter with the threshold;
classify a type of the violation of the operating parameter of the component as a non-destructive violation or a destructive violation;
communicate, to a host device, an indication that the parameter satisfies the threshold based at least in part on determining that the parameter satisfies the threshold, the indication comprising the classified type of the violation;
receive, from the host device, an indication for operating the memory device based at least in part on communicating the indication that the parameter satisfies the threshold; and
adjust, based at least in part on receiving the indication for operating the memory device, one or more parameters associated with operating the memory device.

14. The memory device of claim 13, wherein, to communicate the indication, the circuitry is further operable to:
communicate an indication of a life expectancy of the memory device, wherein the threshold comprises a level of wear of the component that is associated with the life expectancy of the memory device.

15. The memory device of claim 13, wherein, to communicate the indication, the circuitry is further operable to:
communicate an indication of a rate of degradation of the component that is based at least in part on the level of wear of the component, wherein the threshold comprises a threshold rate of degradation of the component.

16. The memory device of claim 13, further comprising:
one or more counters configured to determine a quantity of violations associated with the violation of the operating parameter or a duration associated with the violation of the operating parameter, or both, the indication including an indication of the quantity of violations associated with the violation of the operating parameter, or the duration associated with the violation of the operating parameter, or both.

17. A method, comprising:
receiving, at a host device from a memory device, an indication that a first parameter associated with a component of the memory device has satisfied a threshold, the first parameter associated with a level of wear of the component, a violation of an operating parameter of the component, or both, wherein the indication comprises a type of the violation of the operating parameter of the component classified at the memory device as a non-destructive violation or a destructive violation, and wherein the threshold comprises a threshold violation of the operating parameter for the component;
adjusting a second parameter associated with operating the memory device based at least in part on receiving the indication that the first parameter has satisfied the threshold; and communicating, to the memory device, an indication for operating the memory device based at least in part on adjusting the second parameter.

18. The method of claim 17, wherein receiving the indication comprises:

receiving an indication of a life expectancy of the memory device, wherein the threshold comprises a level of wear of the component that is associated with the life expectancy of the memory device.

19. The method of claim 17, wherein receiving the indication comprises:

receiving an indication of a rate of degradation of the component that is based at least in part on the level of wear of the component, wherein the threshold comprises a threshold rate of degradation of the component.

20. The method of claim 17, wherein receiving the indication comprises:

receiving an indication of a severity associated with the violation of the operating parameter, a quantity of violations associated with the violation of the operating parameter, a magnitude associated with the violation of the operating parameter, or a duration associated with the violation of the operating parameter, or any combination thereof.

21. The method of claim 17, wherein receiving the indication comprises:

receiving an indication of one or more suggested actions for operating the memory device.

22. The method of claim 17, wherein adjusting the second parameter associated with operating the memory device comprises:

adjusting one or more parameters associated with a temperature of the memory device, a refresh rate of the memory device, a voltage level of the memory device, or any combination thereof, the indication for operating the memory device indicative of the one or more parameters.

* * * * *